US007897135B2

(12) United States Patent
Martirosyan et al.

(10) Patent No.: US 7,897,135 B2
(45) Date of Patent: Mar. 1, 2011

(54) CARBON COMBUSTION SYNTHESIS OF OXIDES

(75) Inventors: Karen S. Martirosyan, Houston, TX (US); Dan Luss, Houston, TX (US)

(73) Assignee: University of Houston, Houston, TX (US)

( * ) Notice: Subject to any disclaimer, the term of this patent is extended or adjusted under 35 U.S.C. 154(b) by 817 days.

(21) Appl. No.: 11/231,450

(22) Filed: Sep. 21, 2005

(65) Prior Publication Data

US 2006/0097419 A1 May 11, 2006

Related U.S. Application Data

(60) Provisional application No. 60/613,281, filed on Sep. 27, 2004.

(51) Int. Cl.
*C01G 1/00* (2006.01)
*C01G 9/00* (2006.01)
*C01G 19/00* (2006.01)
*C01G 23/00* (2006.01)
*C01G 49/00* (2006.01)
*C01G 51/00* (2006.01)

(52) U.S. Cl. .............. 423/593.1; 423/594.1; 423/594.5; 423/598; 423/599; 423/600; 423/601; 423/602; 423/594.12; 423/594.15

(58) Field of Classification Search .............. 423/594.1, 423/594.5, 598, 599, 600, 601, 602, 594.12, 423/594.15, 593.1
See application file for complete search history.

(56) References Cited

U.S. PATENT DOCUMENTS

| | | | |
|---|---|---|---|
| 4,988,480 A | 1/1991 | Merzhanov et al. | |
| 5,064,808 A | 11/1991 | Merzhanov et al. | |
| 5,188,678 A | 2/1993 | Sekhar et al. | |
| 5,200,390 A | 4/1993 | Howng | |
| 5,607,887 A | 3/1997 | Pejryd et al. | |
| 5,792,417 A | 8/1998 | Yi et al. | |
| 6,645,424 B2 | 11/2003 | Yi et al. | |

FOREIGN PATENT DOCUMENTS

| | | | |
|---|---|---|---|
| JP | 63021206 | | 1/1988 |
| JP | 63021206 A | * | 1/1988 |
| RO | 119458 B1 | * | 11/2004 |

OTHER PUBLICATIONS

Valenzuela, "Magnetic Ceramics," Cambridge University Press, p. 311 (1994).
Segal, "Chemical Synthesis of Advanced Ceramic Materials," Cambridge University Press, Cambridge, p. 182 (1989).
Rao, "Chemical Approaches to the Design of Oxide Materials," Pure & App. Chem., 66(9), 1765-1772 (1994).
Brinker et al., "Sol-Gel Science: The Physics and Chemistry of Sol-Gel Processing," Academic Press, p. 908 (1989).
Masters, Spray Drying Handbook, 4th ed., George Godwin Limited, London, p. 696 (1985).
Aruna et al., "Combustion synthesis and properties of strontium substituted lanthanum manganites La1-xSrxMnO3 (0•x•0.3)," Journal of Materials Chemistry, 7(12), 2499-2503 (1997).
Mukasyan et al., "Perovskite membranes by aqueous combustion synthesis: synthesis and properties," Separation and Purification Technology, 25, 117-126 (2001).
Barrer, "Hydrothermal Chemistry of Zeolites," Academic Press, London, p. 360 (1982).
Hirano, "Hydrothermal synthesis and characterization of ZnGa2O4 spinel fine particles," Journal of Materials Chemistry, 10(2), 469-472 (2000).
Singh et al., "Low-temperature Synthesis of Mn0.2Ni0.2Zn0.6Fe2O4 Ferrites by Citrate Precursor Method and Study of their Properties," Physica Status Solidi, 201, 7, 1453-1457 (2004).
Kandori et al., "Roles of Metal Ions in the Formation of Hematite Particles from Forced Hydrolysis Reaction," Ind. Eng. Chem. Res., 39, 2635-2643 (2000).
Vestal et al., "Magnetic spinel ferrite nanoparticles from Microemulsions," Int. J. of Nanotechnology, 1(1/2), 240-263 (2004).
Tretyakov et al., "Recent progress in cryochemical synthesis of oxide materials," J. Mater. Chem., 9, 19-24 (1999).
Merzhanov, "The Chemistry of Self-propagating High-temperature synthesis," Journal of Mater. Chem., 14, 1779-1786 (2004).

(Continued)

*Primary Examiner* — Timothy C Vanoy
*Assistant Examiner* — James A Fiorito
(74) *Attorney, Agent, or Firm* — Winstead PC

(57) ABSTRACT

The present invention is generally directed to a novel, economic synthesis of oxide ceramic composites. Methods of the present invention, referred to as carbon combustion synthesis of oxides (CCSO), are a modification of self-propagating high-temperature synthesis (SHS) methods in which the heat needed for the synthesis is generated by combustion of carbon in oxygen rather than that of a pure metal. This enables a more economic production of the ceramic material and minimizes the presence of intermediate metal oxides in the product. The reactant mixture generally comprises at least one oxide precursor (e.g., a metal or non metal oxide, or super oxide, or nitride, or carbonate, or chloride, or oxalate, or halides) as a reactant, but no pure metal. Pure carbon in the form of graphite or soot is added to the reactant mixture to generate the desired heat (upon ignition). The mixture is placed in a reactor and exposed to gaseous oxygen. The high-temperature exothermic reaction between the carbon and oxygen generates a self-sustaining reaction in the form of a propagating temperature wave that causes a reaction among the reactants. The reaction proceeds rapidly following ignition, and the final product comprises simple and/or complex oxides of elements present in the oxide precursor(s). CCSO also enables synthesis of oxides that cannot be produced by conventional SHS, such as when the pure metal is pyrophoric (such as Li or La) or such as when it melts at room temperature (e.g., Ga) or such as the combustion heat of the metal is relatively low.

25 Claims, 13 Drawing Sheets

OTHER PUBLICATIONS

Borovinskaya, "Chemical classes of the SHS processes and materials," Pure & App. Chem., 64(7), 919-940 (1992).

Munir et al., "Synthesis of High-Temperature Materials by Self-propagating Combustion Methods," Am. Ceramic Soc. Bull., 67(2), 342-349 (1988).

Nersesyan et al., "Self-Propagating High-Temperature Synthesis of Ferrites," Inorgan. Mater, 29(12), 1506-1508 (1993).

Varma et al., "Combustion Synthesis of Advanced Materials: Principles and Applications," Advances in Chemical Engineering, 24, 79 (1998).

Lin et al., "SHS of YBa2Cu3O6+x Using Large Copper Particles," Physica C, 218, 130-136 (1993).

Avakyan et al., "Phase-Formation During the SHS of Barium Ferrites," Int. J. of SHS, 1(4), 551-554 (1992).

Avakyan et al., "New Materials for Electronic Engineering," Amer. Ceram. Sos. Bull, 75(2), 50-54 (1996).

Martirosyan et al., "Synthesis of Lead Ferrite in a Combustion Mode," Int. J. of SHS, 10(2), 193-199 (2001).

Martirosyan et al., "Phase-Formation during Self-Propagating High-Temperature Synthesis of Ferrites," Inorgan. Mater., 38(4), 400-403 (2002).

Ming et al., "Reaction Steps and Microstructure Formation during SHS of La0.8Sr0.2CrO3," Combust. Sci. and Tech., 128, 279-294 (1997).

Ming et al., "Chemical Rate processes Involved in SHS of La0.9Sr0.1CrO3," Int. J. of SHS, 7(4), 457-473 (1998).

Ming et al., "A new route to synthesize La1-xSrxMnO3," J. Mater. Sci., 35, 3599-3606 (2000).

Xanthopoulou G., "Oxidative dehydrodimerization of methane using manganese based catalysts made by self-propagating high-temperature combustion synthesis", Chem. Eng. Technol. 24 (10), 1025-1034 (2001).

Gol'dshleger et al., "Laws Governing Ignition and Combustion of Zirconium: II. Activated Combustion of Zr in Nitrogen," Fizika Gorenia i Vsryva, 13, 783 (1977).

Gol'dshleger et al., "Trends in the Ignition and Combustion of Zirconium: I. Effects of Previous Treatment on Ignition in Oxygen," Fizika Gorenia i Vsryva, 13, 257 (1977).

Rode et al., "An Experimental Study of Titanium Powder Reactivity in Gaseous Environments. Part I: Oxidation," Combust. Sci. and Tech. 99, 143-160 (1994).

Rode et al., "An Experimental Study of Titanium Powder Reactivity in Gaseous Environments. Part II: Nitridation," Combust. Sci. and Tech. 99, 161-177 (1994).

Martirosyan et al., "Carbon Combustion Synthesis of Complex Oxides: Process Demonstration and Features," AIChE Journal, 51(10), 2801-2810 (2005).

Buchanan (ed.), "Ceramic Materials for Electronics", Dekker (1986).

Iler (ed.), "The Chemistry of Silica", J. Wiley & Sons (1979).

Ming, et al., "Combustion synthesis and characterization of Sr and Ga doped LaFeO3", 122 Solid State Ionics 113 (1999).

Patil, et al., "Combustion synthesis", 2 Sol. State & Mat. Sci. 158 (1997).

Schmitt, "Pyrophoric Materials Handbook", Chapter 2 (1996).

Encycl. of Advanced Materials, Bloor et al. (eds.), Pergamon Press (1994).

* cited by examiner

CARBON COMBUSTION SYNTHESIS OF OXIDES

CROSS-REFERENCE TO RELATED APPLICATIONS

This Application claims priority to U.S. Provisional Application Ser. No. 60/613,281, filed Sep., 27, 2004.

FEDERALLY-SPONSORED RESEARCH

This invention was made, in part, with support from the National Science Foundation, Grant No. CTS-003015.

FIELD OF THE INVENTION

This invention relates generally to methods of synthesizing oxide materials, and specifically to methods of synthesizing such oxide materials via combustion processes.

BACKGROUND OF THE INVENTION

Complex oxides can be produced by several processes that differ in terms of production cost and product properties. The oldest and most common such process involves the calcination of a reactant mixture in a furnace at temperatures of up to 1400° C. for periods of 2-24 hours (Valenzuela, "Magnetic Ceramics," Cambridge University Press, p.311, 1994; Segal, "Chemical Synthesis of Advanced Ceramic Materials," Cambridge University Press, Cambridge, p.182, 1989). In some cases, due to incomplete conversion, the sintered material requires grinding and additional calcination. This process requires an expensive high-temperature furnace and high-energy consumption. Furthermore, the product particle size is often rather large due to the long processing time at high temperatures, thereby requiring extensive size reduction to enable manufacturing of desired devices.

In contrast to the above-described calcinations processes, several wet chemical methods produce a more homogeneous product and enable better control of the particle size, which enables production of final components with superior properties (Rao, "Chemical Approaches to the Design of Oxide Materials," *Pure & App. Chem.*, 66(9), 1765-1772, 1994). These methods include co-precipitation (U.S. Pat. No. 5,200, 390), sol-gel (Brinker et al., "Sol-Gel Science: The Physics and Chemistry of Sol-Gel Processing," Academic Press, p.908, 1989), spray-drying (Masters, Spray Drying Handbook, 4$^{th}$ ed., George Godwin Limited, London, p.696, 1985), aqueous combustion-synthesis (Aruna et al., "Combustion synthesis and properties of strontium substituted lanthanum manganites $La_{1-x}Sr_xMnO_3$ ($0 \leq x \leq 0.3$)," *Journal of Materials Chemistry*, 7(12), 2499-2503, 1997; Mukasyan et al., "Perovskite membranes by aqueous combustion synthesis: synthesis and properties," *Separation and Purification Technology*, 25, 117-126, 2001), hydrothermal (Barrer, "Hydrothermal Chemistry of Zeolites," Academic Press, London, p. 360, 1982; Hirano, "Hydrothermal synthesis and characterization of $ZnGa_2O_4$ spinel fine particles," *Journal of Materials Chemistry*, 10(2), 469-472, 2000), citrate precursor (Singh et al., "Low-temperature Synthesis of $Mn_{0.2}Ni_{0.2}Zn_{0.6}Fe_2O_4$ Ferrites by Citrate Precursor Method and Study of their Properties," *Physica Status Solidi*, 201, 7, 1453-1457, 2004), forced hydrolysis method (Kandori et al., "Roles of Metal Ions in the Formation of Hematite Particles from Forced Hydrolysis Reaction," *Ind. Eng. Chem. Res.*, 39, 2635-2643, 2000), microemulsion (Vestal et al., "Magnetic spinel ferrite nanoparticles from Microemulsions," *Int. J. of Nanotechnology*, 1(1/2), 240-263, 2004), and cryochemical (Tretyakov et al., "Recent progress in cryochemical synthesis of oxide materials," *J. Mater. Chem.*, 9, 19-24, 1999). The wet-chemical methods generally require, however, calcination at a high temperature to obtain a powder product with the desired composition and structure. Additionally, while the wet chemical processes can produce high quality powder, the production costs are usually much higher than those involving calcination.

Another method of producing oxides composites is self-propagating high-temperature synthesis (SHS), also referred to as combustion synthesis (Merzhanov et al., "Method for making a composite," U.S. Pat. No. 4,988,480, issued Jan. 29, 1991; Merzhanov, "The Chemistry of Self-propagating High-temperature synthesis," *Journal of Mater. Chem.*, 14, 1779-1786, 2004; Borovinskaya, "Chemical classes of the SHS processes and materials," *Pure & App. Chem.*, 64(7), 919-940,1992; Munir et al., "Synthesis of High-Temperature Materials by Self-propagating Combustion Methods," *Am. Ceramic Soc. Bull.*, 67(2), 342-349, 1988; Nersesyan et al., "Self-Propagating High-Temperature Synthesis of Ferrites," *Inorgan. Mater*, 29(12), 1506-1508, 1993; Varma et al., "Combustion Synthesis of Advanced Materials: Principles and Applications," *Advances in Chemical Engineering*, 24, 79, 1998). The product particle size is typically smaller than that produced by calcinations, but larger than that attained in several wet-chemical methods. In the SHS process, a highly exothermic reaction between a metal powder (such as Fe, Ti, Zr, Al, Mg, Ni, Cu, Hf, Nb, etc.) and an oxidizer generates a high temperature (e.g., on the order of ca. 2000° C.) front that propagates through the reactant mixture converting them to products. The solid-state reaction continues after the combustion in the post-combustion zone. SHS may also be conducted in a thermal explosion mode, in which the reactants are heated uniformly and the combustion is initiated simultaneously on the whole surface of the sample. The major advantages of SHS of oxides composites are: (i) low external energy consumption and no need for a high temperature furnace; (ii) a very short reaction time (the typical combustion velocity is from a few millimeters to a few centimeters per second); (iii) the possibility of synthesizing simple and complex oxide compounds; (iv) versatility of reactor design and simplicity of the entire process; (v) products that often have superior properties over those synthesized by other methods; and (vi) possible in situ densification to form desired parts or articles.

Reported synthesis of complex oxides by SHS include, superconducting oxides (Merzhanov et al., "Method of manufacturing oxide superconductors using self-propagating high-temperature synthesis," U.S. Pat. No. 5,064,808, issued Nov. 12, 1991; Lin et al., "SHS of $YBa_2Cu_3O_{6+x}$ Using Large Copper Particles," *Physica C*, 218, 130-136, 1993), magnetic ferrites (Avakyan et al., "Phase-Formation During the SHS of Barium Ferrites," *Int. J. of SHS*, 1(4), 551-554, 1992, Avakyan et al., "New Materials for Electronic Engineering," *Amer. Ceram. Sos. Bull*, 75(2), 50-54, 1996; Martirosyan et al., "Synthesis of Lead Ferrite in a Combustion Mode," *Int. J. of SHS*, 10(2), 193-199, 2001, Martirosyan et al., "Phase-Formation during Self-Propagating High-Temperature Synthesis of Ferrites," *Inorgan. Mater.*, 38(4), 400-403, 2002), fuel cell components (Ming et al., "Reaction Steps and Microstructure Formation during SHS of $La_{0.8}Sr_{0.2}CrO_3$," *Combust. Sci. and Tech.*, 128, 279-294, 1997, Ming et al., "Chemical Rate processes Involved in SHS of $La_{0.9}Sr_{0.1}CrO_3$," *Int. J. of SHS*, 7(4), 457-473, 1998; Ming et al., "Combustion Synthesis and characterization of Sr and Ga doped $LaFeO_3$," *Solid State Ionics*, 122, 113-121, 1999, Ming et al., "A new route to synthesize $La_{1-x}Sr_xMnO_3$," *J. Mater. Sci.*, 35, 3599-3606, 2000), catalysts (Xanthopoulou G., "Oxidative dehydrodimerization of methane using manganese based catalysts made by self-propagating high-temperature combustion synthesis", *Chem. Eng. Technol.* 24 (10), 1025-1034, 2001), and glass ceramics and mixed-oxide materials (Yi et al., "Method of manufacturing aluminoborate glass-ceramic composite," U.S. Pat. No. 5,792,417 issued Aug., 11, 1998, Yi et al., "Combustion synthesis of glass ($Al_2O_3$—CaO—X—Y) ceramic ($TiB_2$) composites," U.S. Pat. No. 6,645,424, Nov., 11, 2003; Pejryd et al., "Method for preparing ceramic mixed-oxide materials, particularly intended to be used as matrix material in composite ceramic products," U.S. Pat. No. 5,607,887, issued March 4, 1997; Sekhar et al., "Manufacture of net shaped metal ceramic composite engineering components by self-propagating synthesis," U.S. Pat. No. 5,188,678, issued Feb., 23, 1993).

When the pure metal powder (Fe, Ni, Ti, Zr, Ta, etc.) that is used as a fuel component in the green charge is considerably more expensive than their other precursors, such as carbonates, oxides, nitrates, etc., production by SHS may be more expensive than calcination processes. Moreover, SHS cannot be used when the pure metal combustion is not highly exothermic, or when the fine powder of pure metal is either highly pyrophoric (e.g., lithium and lanthanum) or melts at room temperature (e.g., gallium). In addition, melting of the metal powder during SHS may have a deleterious impact on the product homogeneity. In addition, if some reactants are hygroscopic it may be difficult to mix them adequately by ball milling, and preparation and storage of the metal powders may affect the reactivity of the combustion (Goldshleger et al., "Laws Governing Ignition and Combustion of Zirconium: II. Activated Combustion of Zr in Nitrogen," *Fizika Gorenia i Vsryva*, 13, 783, 1977; Goldshleger et al., "Trends in the Ignition and Combustion of Zirconium: I. Effects of Previous Treatment on Ignition in Oxygen," *Fizika Gorenia i Vsryva*, 13, 257, 1977). For example, freshly prepared Ti powder is pyrophoric and ignites at room temperature. It well known that a thin oxide layer forms on the surface of metal particles, affecting their oxidation reactivity. For example, Rode and Hlavacek, (Rode et al., "An Experimental Study of Titanium Powder Reactivity in Gaseous Environments. Part I: Oxidation," *Combust. Sci. and Tech.* 99, 143-160, 1994; Rode et al., "An Experimental Study of Titanium Powder Reactivity in Gaseous Environments. Part II: Nitridation," *Combust. Sci. and Tech.* 99, 161-177, 1994) reported that titanium powder aging in oxygen and nitrogen affected their combustion properties.

Thus, while SHS of oxides has many advantages over calcinations and wet chemical methods, it still has limitations, particularly with regard to production costs and material compatibility. Accordingly, an improvement on SHS that reduces production costs and makes it more universally applicable, would be a welcome advance.

BRIEF DESCRIPTION OF THE INVENTION

An object of the present invention is to provide a method of combustion synthesis of oxide composites that is more economical than existing methods. The process described herein uses heat produced by a highly exothermic chemical reaction between a carbon and oxygen to generate a high temperature front that propagates through a reactant mixture comprising oxide precursors so as to convert them to simple or complex oxide products. In some embodiments, the present invention enables the synthesis of oxides that have not been feasible by conventional self-propagating high-temperature synthesis (SHS). Accordingly, methods of the present invention can be viewed as improvements over SHS, whereby such methods are more economical and more universally applicable.

Methods of the present invention, referred to herein as "carbon combustion synthesis of oxides (CCSO)," are improvements of SHS that reduce the production cost of the oxide composites by replacing the expensive pure metal fuel with inexpensive carbon powder and metal-containing oxide precursor compounds. CCSO enables synthesis of complex oxides such as lithium gallium oxide ($LiGa_5O_8$) or lanthanum gallium oxide ($LaGaO_3$) that cannot be synthesized by conventional SHS. In some embodiments, CCSO improves the mixing of the reactants due to the lubricating properties of carbon. Additionally, oxides made by the CCSO methods of the present invention typically comprise smaller particles, require less post-synthesis grinding, and are porous and friable.

In some embodiments, the present invention is directed to methods comprising the steps of: forming a powdered reactant mixture and igniting the reactant mixture to initiate reaction. The reactant mixture generally comprises at least one oxide precursor such as, but not limited to, a metal oxide or super oxide, metal carbonate, metal nitride, metal halide, metal oxalate, and combinations thereof, but generally no pure metal. The reactant mixture further comprises carbon powder, typically in the form of graphite powder or soot, and this reactant mixture is exposed to gaseous oxygen in a reactor environment. Following ignition, the exothermic reaction between the carbon and oxygen generates a propagating temperature wave that causes a reaction among the reactants. The final product(s) are simple or complex oxides of elements present in the oxide precursors.

In addition to the economic advantages described above, carbon combustion synthesis of oxides can be used to produce oxides even when SHS cannot be applied, such as when the pure metal is pyrophoric (e.g., Li and La) or that it melts at room temperature (e.g., Ga) or that the combustion heat of the metal is relatively low. In contrast to the common SHS, the heat-generating product (carbon dioxide) departs from the sample, which makes the products porous and friable. This is an important feature for further processing of the product. In addition, the lubricating properties of the carbon help attain a uniform reactant mixture following ball milling. Thus, the CCSO-based methods of the present invention represent an exceptional advance in the combustion synthesis of oxides.

The foregoing has outlined rather broadly the features of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE INVENTION

Figure 1:
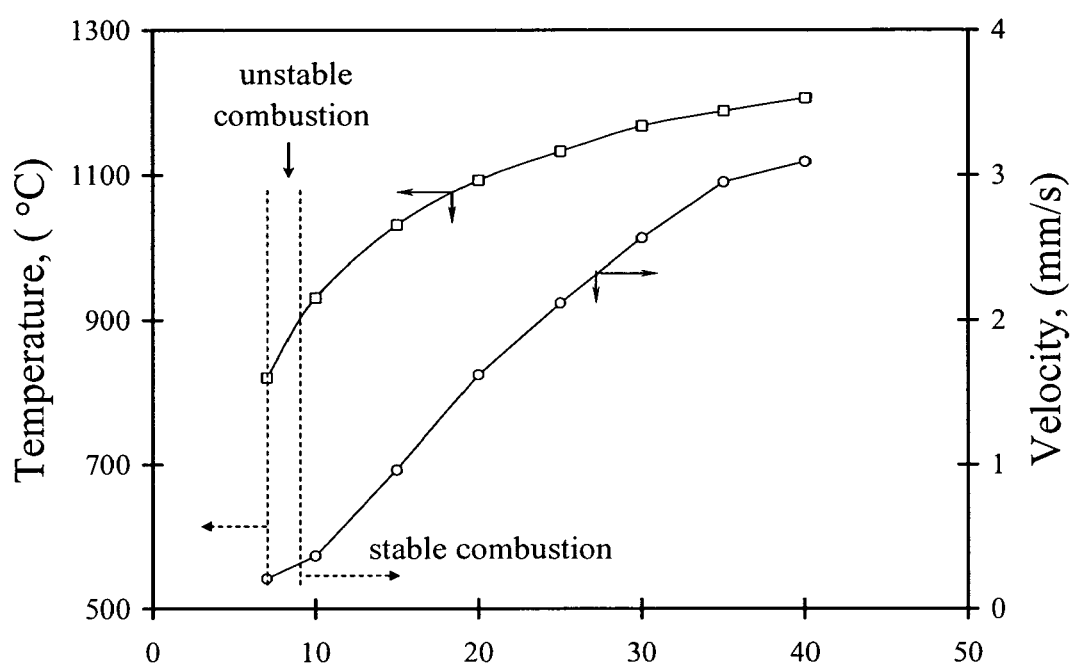
FIG. 1 depicts the influence of the carbon concentration in the green charge on the maximum reaction temperature and average front velocity and combustion regime during the carbon combustion synthesis of $BaTiO_3$ via reaction (2)

Generally, the present invention represents an improvement over the self-propagating high-temperature synthesis (SHS) methods described in the background section. In some embodiments, the present invention enables a more economical synthesis of complex oxides, particularly in cases where the cost of the pure metal represents a large fraction of the that of the entire reactant mixture; and it enables production of oxides that cannot be produced by SHS, thereby making methods of the present invention more universally applicable than SHS.

In contrast to SHS, in the methods of the present invention, carbon powder is used as the fuel instead of a pure metal in the combustion synthesis of both simple and complex oxides. This novel method, referred to herein as "carbon combustion synthesis of oxides (CCSO)," is therefore a modified form of traditional SHS. However, the reactant mixture used in CCSO is usually less expensive than that used in SHS, as instead of pure metal oxide precursors it utilizes a less-expensive metal-containing compound (e.g., oxide, carbonate, nitrate, etc.) mixed together with carbon powder.

In some embodiments, the present invention is directed to novel economic syntheses of oxide composites such as, but not limited to, ferroelectrics, hard and soft magnetic ferrites, fuel cell components, battery electrode materials, catalysts, membranes, glass-ceramic, pigments and the like. Such materials can be used to produce essential components of electric and electronic devices, catalysts, and color additives (The Encyclopedia of Advanced Materials, ed. by D. Bloor et al, Pergamon, Oxford, v. 1-4, p.3152, 1994; Ceramic Materials for Electronics: Processing, Properties, and Applications, ed. by R. C. Buchanan, Marcel Dekker, Inc., NY-Basel, p. 481, 1986).

In some embodiments, the CCSO-based methods of the present invention comprise the following steps: (a) mixing powdered oxide precursors with carbon powder to form a reactant mixture; (b) placing the reactant mixture in a reactor environment comprising oxygen; and (c) igniting the reactant mixture to generate a high-temperature front that propagates through the reactant mixture and converts the oxide precursors to an oxide product, wherein such an oxide product can be either a simple or complex oxide.

In some of the above-mentioned embodiments, the powdered oxide precursors comprise metal containing compounds and/or non-metal containing compounds. In some such embodiments, the metal containing compounds are selected from the group consisting of metal oxides, metal nitrides, metal carbonates, metal oxalates, metal halides, metal phosphates, metal sulfates, and combinations thereof. In some or other such embodiments, the non-metal containing compounds comprise a species selected from the group consisting of oxides, nitrides, carbides, and combinations thereof of at least one non-metal element selected from the group consisting of B, Si, As, Te, Ge, P, Se, S, and combinations thereof. In some such embodiments, the powdered oxide material is comprised of particles having an average particle diameter in the range of from about 2 nm to about 500 micron.

In some of the above-mentioned embodiments, the carbon powder is selected from the group consisting of carbon black, graphite, activated carbon, soot, petroleum coke, and combinations thereof. In some such embodiments, the reactant mixture comprises carbon powder in an amount ranging from about 5 wt. % to about 60 wt. %. In some embodiments, this carbon powder is comprised of particles having an average particle diameter in the range of from about 2.0 nm to about 2.0 mm. In some or other such embodiments, the carbon powder is characterized by having a surface area in the range of from about 0.2 m 2/g to about 200 m$^2$/g.

The reactor environment is generally of a flow type, such that the gaseous by-products can be removed during the course of the reaction. However, such an environment could also be of a static type. Oxygen in the reactor environment is typically supplied neat, but could also be diluted or supplied as air. Additionally or alternatively, other oxidants or oxidation facilitators (e.g., N$_2$O) could be employed.

In some of the above-described embodiments, the step of igniting the reaction mixture involves a heating technique selected from the group consisting of flame ignition, electrical heater ignition, laser beam ignition, microwave ignition, and combinations thereof. This ignition can be carried out locally at a specific region of the mixture, or it can be carried out homogeneously using, for example, microwave or radiofrequency (RF) heating.

Generally speaking, the carbon combustion synthesis of oxides comprises the chemical reactions:

$$\sum_{i=1}^{n} \mu_i X_i^{(s)} + \alpha C^{(s)} + \beta O_2^{(g)} = \sum_{j=1}^{m} P_j^{(s)} + \delta CO_2^{(g)} + Q \text{ where,} \quad (1)$$

$$\alpha = \frac{x/12}{(100-x)/\sum \mu_i M_i^{(s)}}$$

and $x_i^{(s)}$ is a solid compound containing the metal needed to form the oxide (such as an oxide, super oxide, nitride, or carbonate, chloride, or oxalate, etc.), $M_i^{(s)}$ is the molecular weight of the i-th component, $P_j^{(s)}$ is a solid product, $\mu_i$, $\beta$ and $\delta$ are stoichiometric coefficients, x is the carbon weight percent in the mixture, and Q is the heat of the reaction. The superscripts (s) and (g) refer to the solid and gas phases, respectively. The combustion features (such as combustion front velocity) and product properties may be adjusted by the amount of carbon added to the mixture of solid reactants.

While the discussion herein generally involves the formation of simple and complex metal oxides, the methods described herein are generally applicable to all oxides. For example, the oxide precursor may comprise a silicon (Si)-containing compound, such that the final oxide product, after combustion synthesis, comprises Si. The incorporation of such non-metallic elements is particularly relevant for the production of complex oxides, wherein the product complex oxides comprise a mixture of metal and non-metal elements.

Applicants have used CCSO to produce several exemplary product oxides, many of which have important applications. Specifically, Applicants have used CCSO to synthesize: ferroelectric materials such as barium and strontium titanate ($BaTiO_3$, $SrTiO_3$); hard magnetic materials such as cobalt ferrite ($CoFe_2O_4$), barium and strontium hexaferrites ($BaFe_{12}O_{19}$, $SrFe_{12}O_{19}$); soft magnetic materials such as yttrium ferrite ($Y_3Fe_5O_{12}$), manganese-zinc ferrite ($Mn_{0.73}Zn_{0.27}Fe_2O_4$), nickel-zinc ferrite $Ni_{0.35}Zn_{0.65}Fe_2O_4$; fuel-cell electrode components such as lanthanum gallium oxide ($LaGaO_3$), lanthanum-strontium-manganese oxide $La_{0.6}Sr_{0.4}MnO_3$, and lanthanum-strontium-iron-gallium oxide ($La_{0.5}Sr_{0.5}Fe_{0.8}Ga_{0.2}O_3$); optoelectronic materials such as $LiGa_5O_8$ and $LaAlO_3$; solar cell material ($ZnGa_2O_4$); a battery electrode materials such as lithium manganese oxide ($LiMn_2O_4$) and ($CaSnO_3$); catalysts material $LaMnO_3$; and ceramic pigments ($Co_2B_2O_5$) and ($CoAl_2O_4$). Such syntheses and characterization are further described by Applicants in Martirosyan et al., "Carbon Combustion Synthesis of Complex Oxides: Process Demonstration and Features," *AIChE Journal,* 51(10), 2801-2810, 2005.

In the exemplary embodiments and Examples described below, the reactants used were commercial available powders (purity of about 99%). The powdered reactant mixture comprised stochiometric amounts of the elements ultimately forming the desired product oxide along with 5-60% carbon powder, or graphite, or soot. A 20 g reactant mixture was thoroughly mixed by ball milling for about 15 min. The powdered reactant mixture sample was placed in a ceramic boat having a relative density of 0.2-0.4. The sample was placed (while in the ceramic boat) in a quartz tube (60 mm in diameter and 300 mm long) or inside a cylindrical stainless steel vessel (70-mm i.d. and 60-mm length) fed by oxygen at a flow rate up to 10 l/min. To initiate the propagating temperature front the reactant mixture was typically ignited locally by a wooden match or an electrical coil. An infrared-transparent sapphire window on top of the vessel enabled viewing and recording of the sample surface radiation by a high speed (i.e., 60 frame/s) infrared (IR) camera (Merlin Mid InSb MWI8, Indigo Systems). The IR images were used to determine the temperature, shape and average combustion front velocity. The local temporal combustion temperature ($T_c$) was measured by inserting an S-type (Pt—Rh) thermocouple of about 0.1 mm diameter in the center of sample. The thermocouple readings were recorded and processed using an Omega data acquisition board connected to a PC.

In the exemplary embodiments and Examples which follow, the phase and microstructure of final product were analyzed by X-ray diffraction (XRD, Siemens D5000, Cu $K_\alpha$ radiation source) and microprobe analysis (JEOL JAX8600). Scans were taken in the range of $5° < 2\theta < 80°$ at 0.1 degree intervals. The mass fraction of each phase in the combustion product was determined by the reference intensity ratio (RIR) method. Crystal cell parameters were calculated and refined from the measured peak positions of all the major reflections. Particle morphologies and microprobe analysis were determined by scanning electron microscopy (SEM) of loose powder affixed to a graphite disk with colloidal graphite paste. Particle size distribution and the surface area of the synthesized powder were determined by a Coulter SA 3100 BET analyzer. Surface areas were determined by the BET and Langmuir methods.

$BaTiO_3$

As an exemplary embodiment of the present invention, Applicants produced $BaTiO_3$ by CCSO using three different Ba-containing precursors, via the reactions

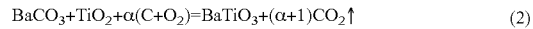

$BaCO_3 + TiO_2 + \alpha(C+O_2) = BaTiO_3 + (\alpha+1)CO_2 \uparrow$ (2)

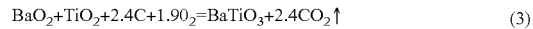

$BaO_2 + TiO_2 + 2.4C + 1.9O_2 = BaTiO_3 + 2.4CO_2 \uparrow$ (3)

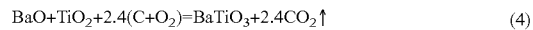

$BaO + TiO_2 + 2.4(C+O_2) = BaTiO_3 + 2.4CO_2 \uparrow$ (4)

The impact of the carbon concentration (up to 40 wt. %) on the maximum reaction temperature and average front velocity during CCSO of $BaTiO_3$ with $BaCO_3$ as the barium precursor (reaction 2) is shown in FIG. 1. A self-sustaining reaction was not attained when x, the carbon weight percent in the reactant mixture, was less than 7. The combustion proceeded in an unstable mode at x=7-8 wt. % and the front extinguished after moving about 2-4 mm. A stable combustion mode, in which the combustion front propagated at a constant velocity, was attained for reactant mixtures with the carbon wt. % exceeding 8. The reaction front propagated at a relatively slow velocity of about 0.4 mm/s using a reactant mixture with 8-10 wt. % carbon and formed a friable and porous product. Increasing the carbon concentration in the green charge increased the average front velocity and maximum temperature. The stable front motion generated using 8-40 wt. % carbon led to maximum temperatures of 900-1200° C., well below the melting temperature of the $BaTiO_3$ product (~1600° C.) and of the carbon (3550° C.). The combustion velocity approached an asymptotic value of about 3 mm/s and the maximum temperature an asymptotic value of about 1200° C. at a carbon concentration of 40 wt. %.

Figure 2:
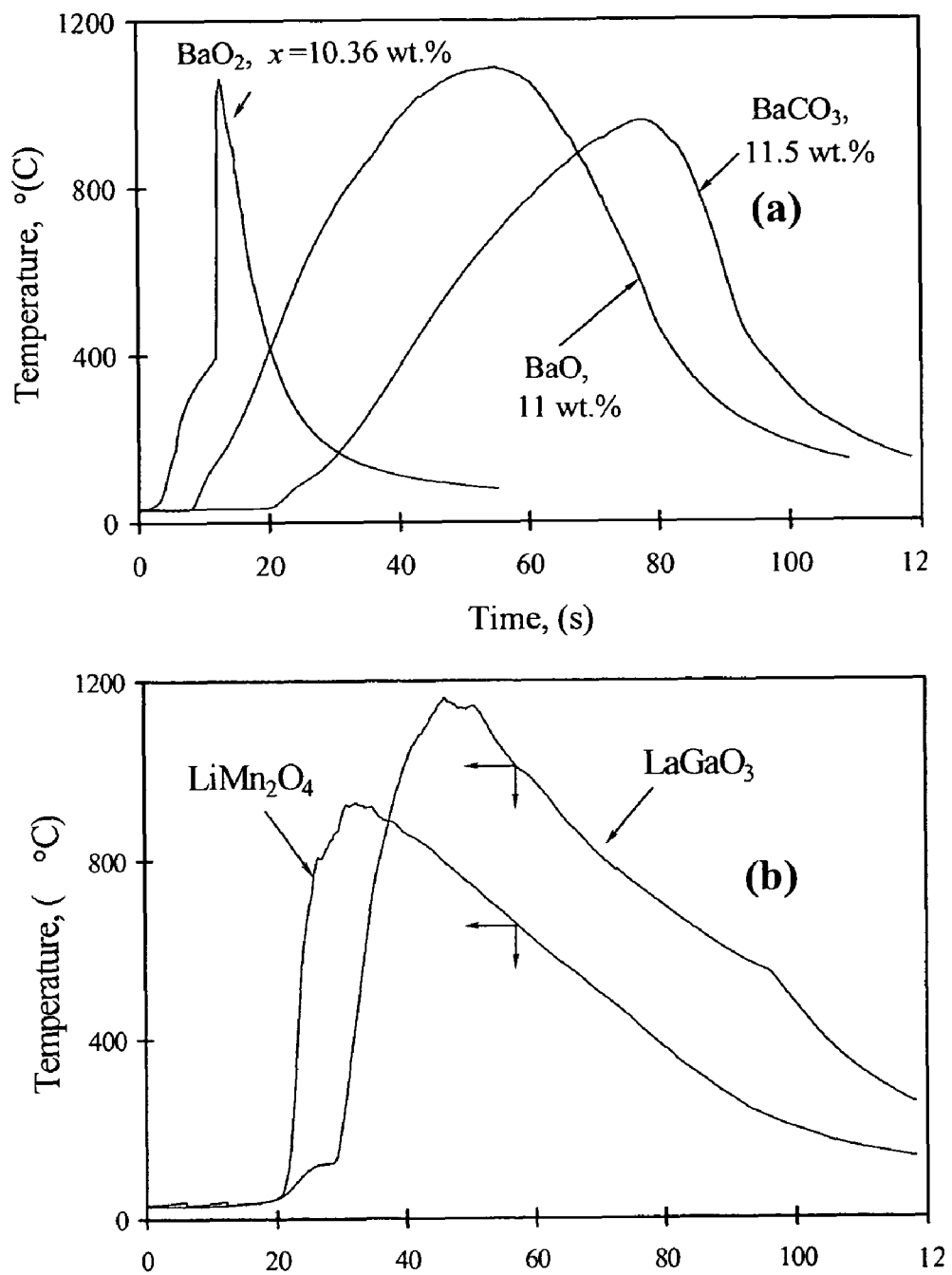
FIGS. 2(*a*) and 2(*b*) depict typical temporal temperature at the center of the loose sample during the formation of (a) $BaTiO_3$ by the CCSO with three different barium precursors ($BaO$, $BaO_2$ and $BaCO_3$), where x is the carbon wt. % in the green charge, and (b) lithium manganese (LiMn$_2$O$_4$) and lanthanum gallium oxide (LaGaO$_3$) by reactions (5) and (6) respectively.

The temporal temperature at the center of the loose powder sample during the CCSO of $BaTiO_3$ by three different barium precursors (reactions 2-4) is shown in FIG. 2(*b*). Using $BaO_2$ as the barium precursor (reaction 3 with x=10.36 wt. %), the temperature rapidly rose after the sample temperature reached 420° C. At this temperature, the barium peroxide decomposed ($BaO_2 \rightarrow BaO + \frac{1}{2}O_2$). The oxygen release increased the rate of the carbon combustion and the temperature rose at a rate of about 700° C./s. The corresponding combustion front propagated at an average velocity of about 0.4 mm/s and emitted many sparks. In contrast, when BaO was the barium precursor (reaction 4), the rate of the temperature rise was much lower, about 22° C./s and the average velocity was 0.36 mm/s. When barium carbonate was the barium precursor (reaction 2 with x=11.5 wt. %), the temperature front velocity was 0.3 mm/s and the rate of the temperature rise about 16° C./s. The corresponding maximum combustion temperature of about 950° C. was lower than those obtained using either $BaO_2$ or BaO as a barium precursor. The lower maximum temperature was probably due to the heat consumed by the decomposition of the barium carbonate, $BaCO_3 \rightarrow BaO + CO_2$.

Figure 3:
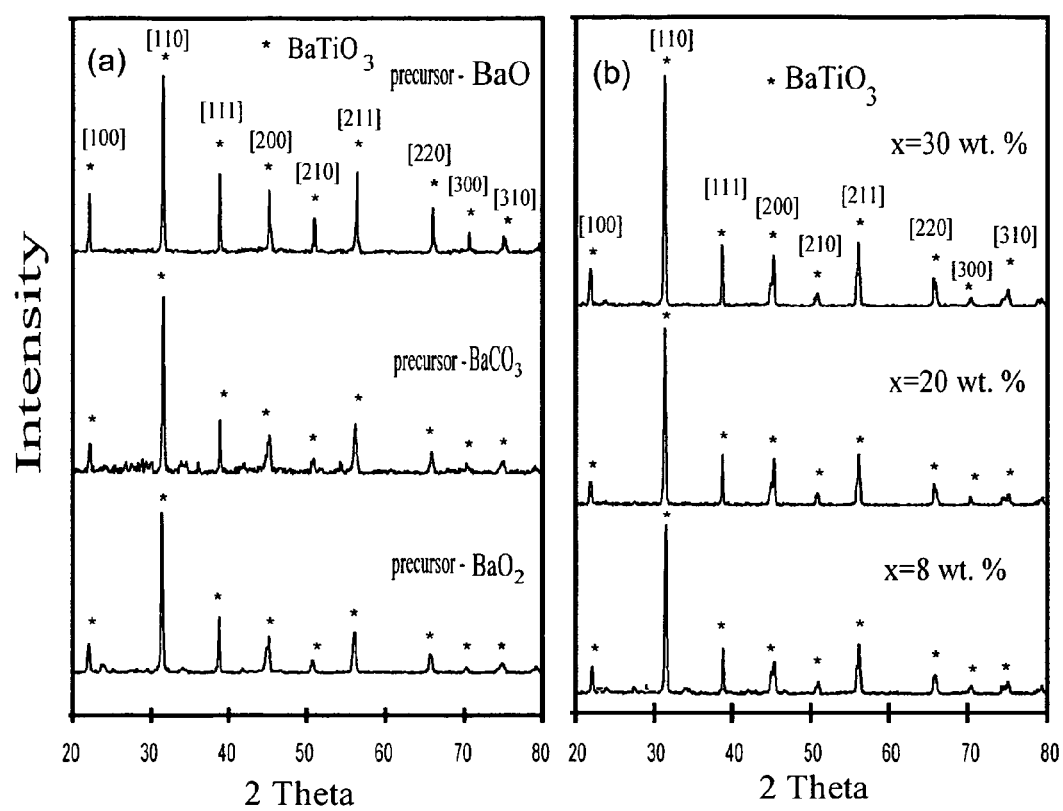
FIGS. 3(a) and 3(b) depict X-ray powder diffraction patterns obtained during carbon combustion synthesis of barium titanate BaTiO$_3$ using: (a) three different Ba-containing reagents BaO, BaCO$_3$ and BaO$_2$; and (b) three different carbon concentrations (8, 20, 30 wt. %) and BaO as Ba-containing reagents.

The XRD patterns of the as-prepared $BaTiO_3$ product (FIG. 3a) indicate that the CCSO led to an almost complete conversion of the reactants to the perovskite phase $BaTiO_3$ when any of the three barium precursors (BaO, $BaO_2$ and $BaCO_3$) was used. The XRD patterns of the synthesized powders from these precursors have a flat background, indicating that amorphous reactants/intermediates/products were not present. The low angle patterns do not include any "amorphous hump" that is indicative of the presence of amorphous material. In all XRD patterns of the products major reflection peaks corresponding to barium titanate ($BaTiO_3$) were observed. X-ray patterns of the product (FIG. 3b) produced by using three different carbon concentrations (8, 20 and 30 wt. %) in the green charge and BaO as Ba-containing reagents identified only $BaTiO_3$. Microprobe analysis confirmed that in all instances the product was $BaTiO_\gamma$, where $\gamma = 3 \pm 0.1$.

Figure 4:
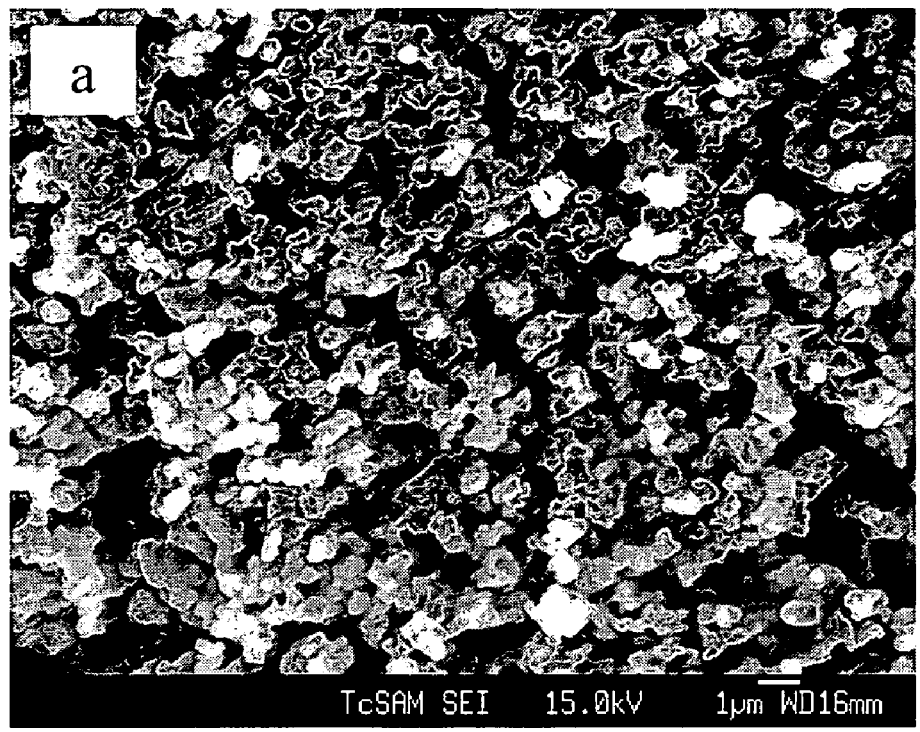
FIGS. 4(a)-4(f) are SEM images depicting characteristic microstructure of as-synthesized BaTiO$_3$ powders produced by carbon combustion synthesis via: (a-c) reactions (2, 3 and 4), respectively; (d-f) using BaCO$_3$ as a barium precursor with carbon concentration of (d) 8 wt. %; (e) 20 wt. % and (f) 30 wt. %.
Figure 4:
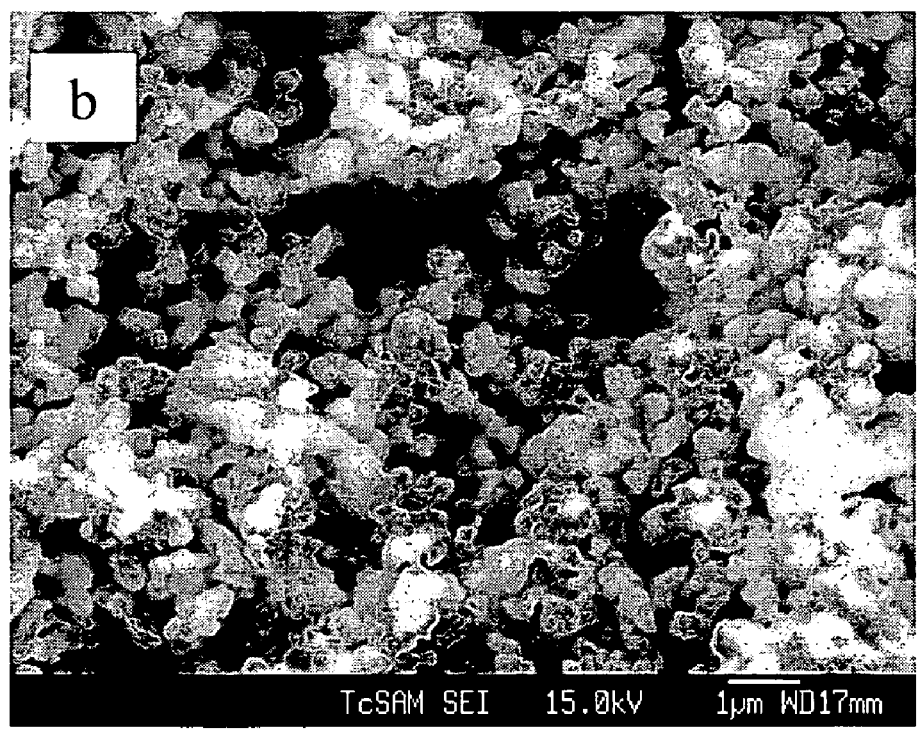
Figure 4:
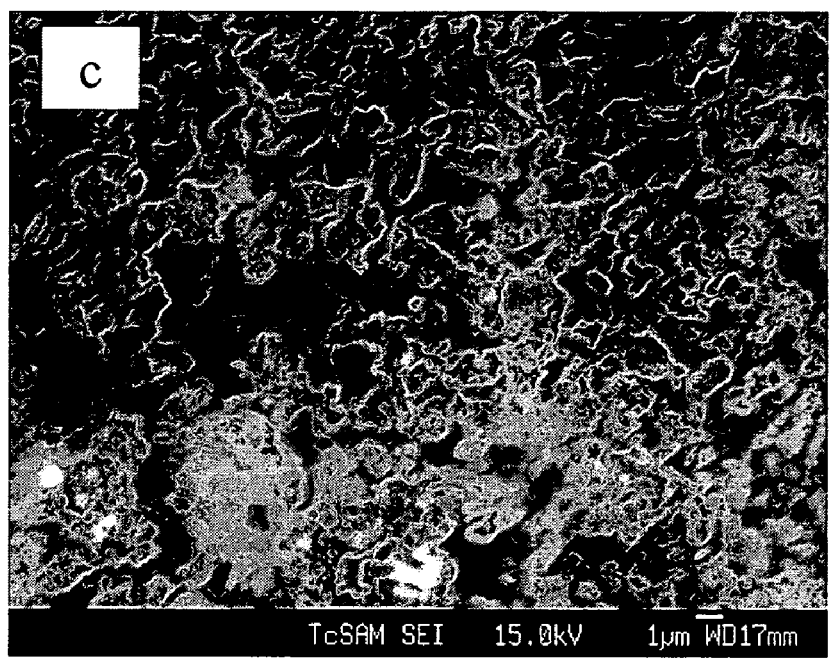
Figure 4:
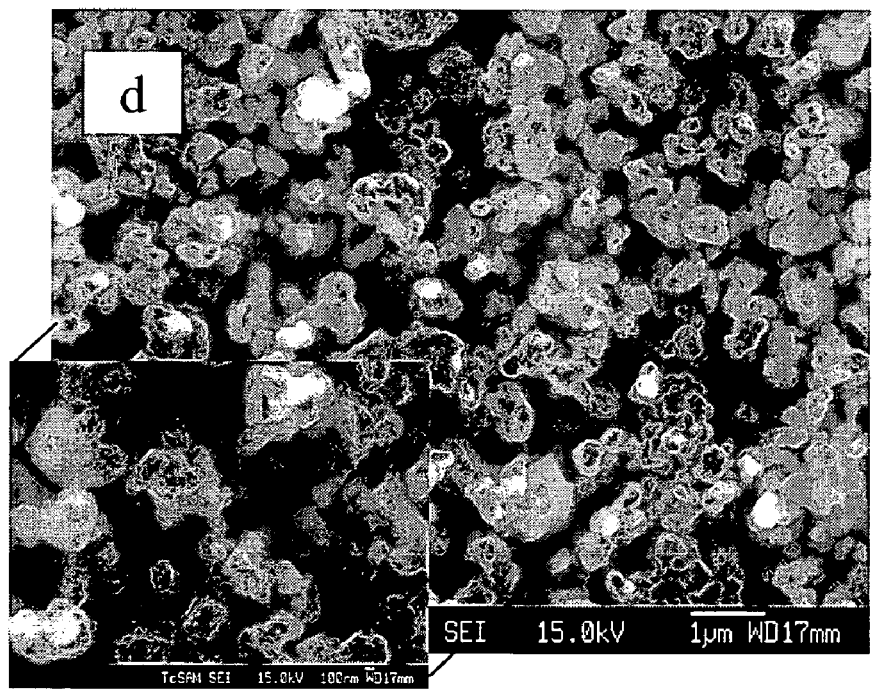
Figure 4:
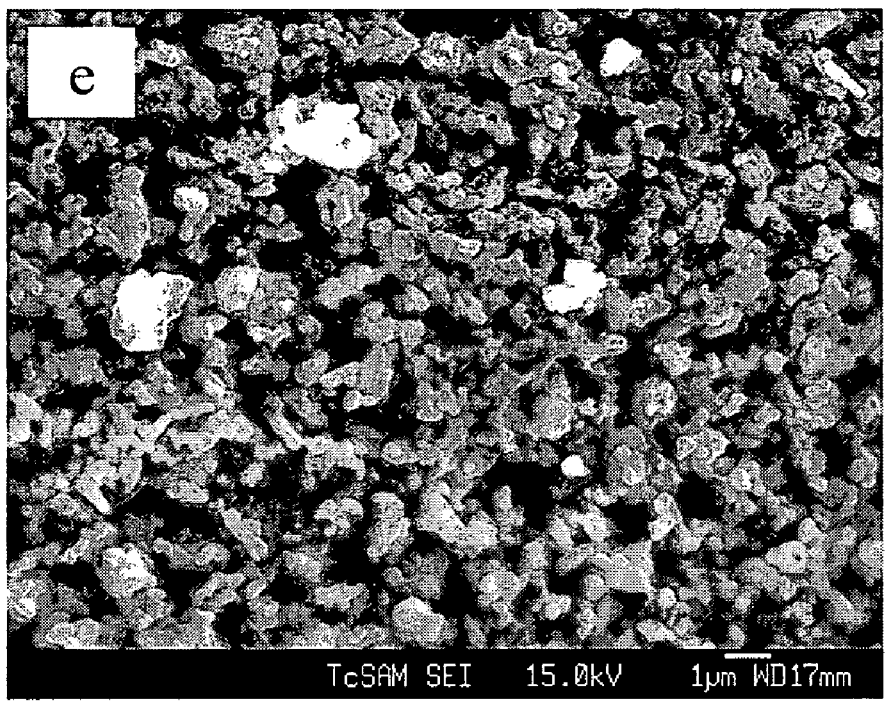
Figure 4:
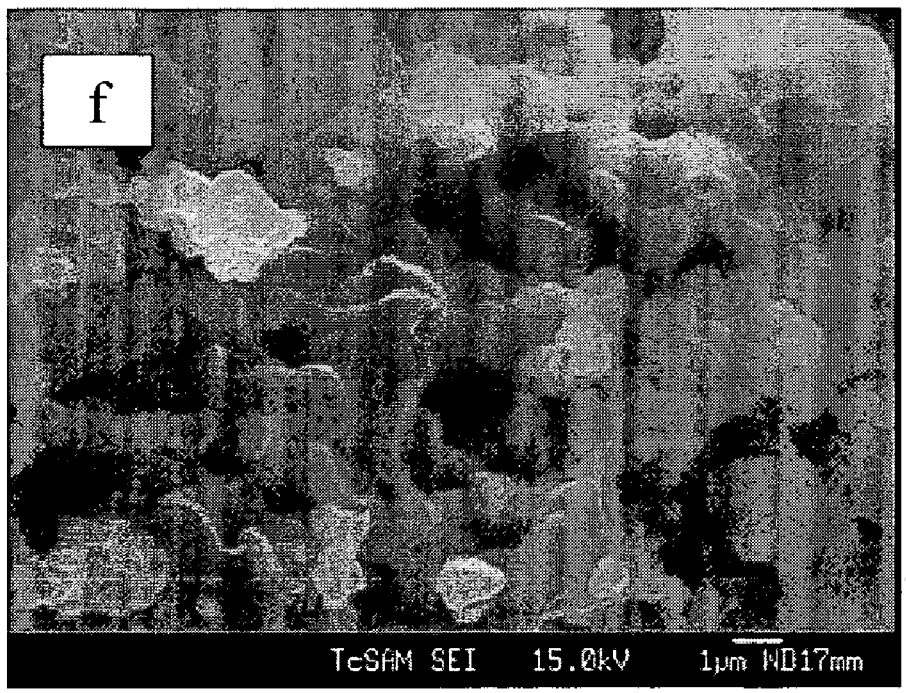

The characteristic microstructure of the barium titanate powder produced by the CCSO for the above-mentioned three precursors and different carbon concentrations is presented in FIG. 4. The average product particle size was about 0.2-1 μm for all precursors when a low carbon concentration of 8-11.5 wt. % was used (FIG. 4, a-d). Higher magnification of these samples shows that the agglomerates comprised small particles with a smooth surface. The carbon combustion caused considerable gas (carbon dioxide) evolution, which generated many pores so that the synthesized powders became friable (the products porosity was up to 70%) and loosely agglomerated. Increasing the carbon concentration up to 30 wt. % decreased the fraction of the submicron particles and increased the pore size. The product was always spongy and the microstructure was homogeneous. After milling under identical conditions for 60 min, the surface area of barium titanate produced by the CCSO was 3.6 m²/g and 1.1 m²/g using mixtures with carbon concentration of 11.5 wt % and 30 wt. %, respectively. The lower combustion temperature obtained at lower carbon concentrations (950° C. with 11.5 wt % of carbon) apparently produced particles with smaller size and hence larger surface area.

$LiMn_2O_4$ and $LaGaO3$

As an exemplary embodiment of the present invention, Applicants used CCSO to produce $LiMn_2O_4$ and $LaGaO_3$ by the reactions

$$Mn_2O_3 + 0.5Li_2O + 2C + 2.25O_2 = LiMn_2O_4 + 2CO_2 \uparrow \quad (5)$$

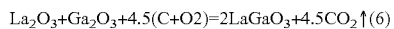
$$La_2O_3 + Ga_2O_3 + 4.5(C + O_2) = 2LaGaO_3 + 4.5CO_2 \uparrow (6)$$

Following ignition of the loose green charge for either reaction (5) or (6), a stable combustion front propagated through the sample and converted the reactant mixture to corresponding oxide products. FIG. 2(a) shows the temporal combustion temperature during the carbon combustion synthesis of lithium manganese and lanthanum gallium oxides. The maximum combustion temperature was about 920° C. during the formation of $LiMn_2O_4$ and 1160° C. during that of $LaGaO_3$. The corresponding average combustion velocities were about 0.3 and 0.5 mm/s. The rate of the temperature rise by reaction (5) was about 100° C./s, while that during the reaction (6) was slower, about 45° C./s. The maximum combustion temperatures in both cases were below the melting temperature of the products $LiMn_2O_4$ (>1000° C.) and $LaGaO_3$ (~1700° C.). Thus, the products were not affected by melting.

Figure 5:
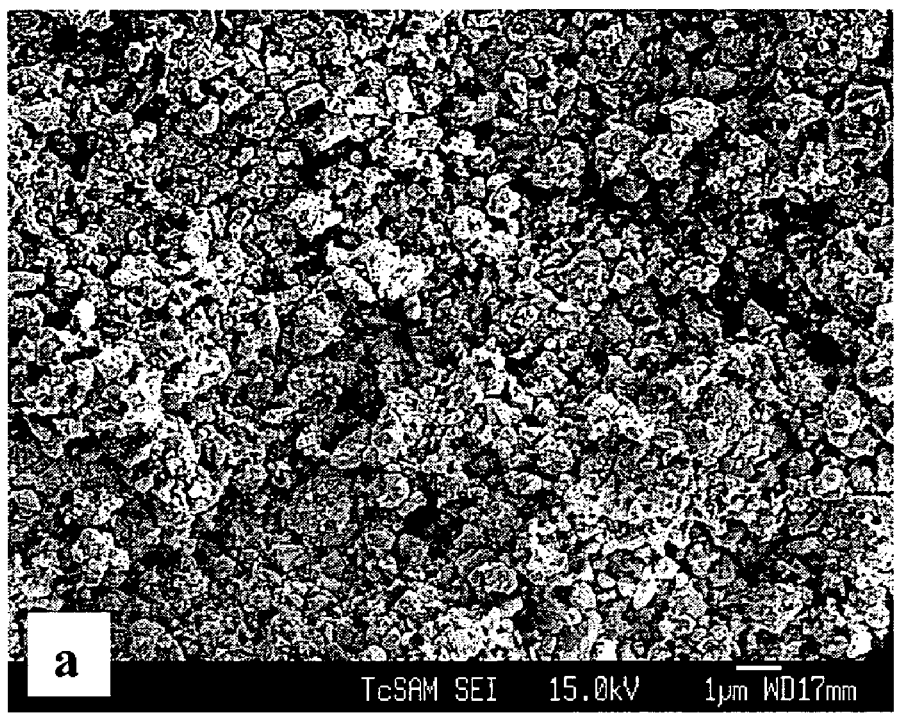
FIGS. 5(a)-5(b) are SEM images depicting the microstructure of as-synthesized powders of (a) LiMn$_2$O$_4$ and (b) LaGaO$_x$ produced by carbon combustion synthesis by reactions (5) and (6)
Figure 5:
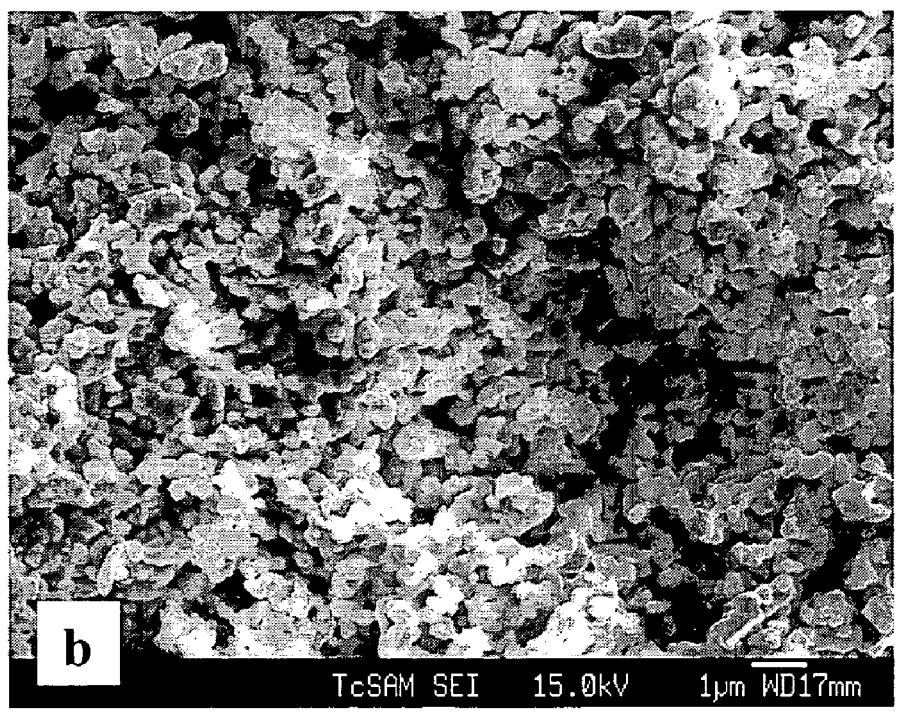

The microstructure of as-synthesized powders of lithium manganese and lanthanum gallium oxides produced by reactions (5) and (6) is shown in FIG. 5. Both products were friable with a spongy structure and composed primarily of agglomerated fine particles with a size of less than ~1 μm. The texture of the as-synthesized samples was homogeneous, comprising many open pores.

Figure 6:
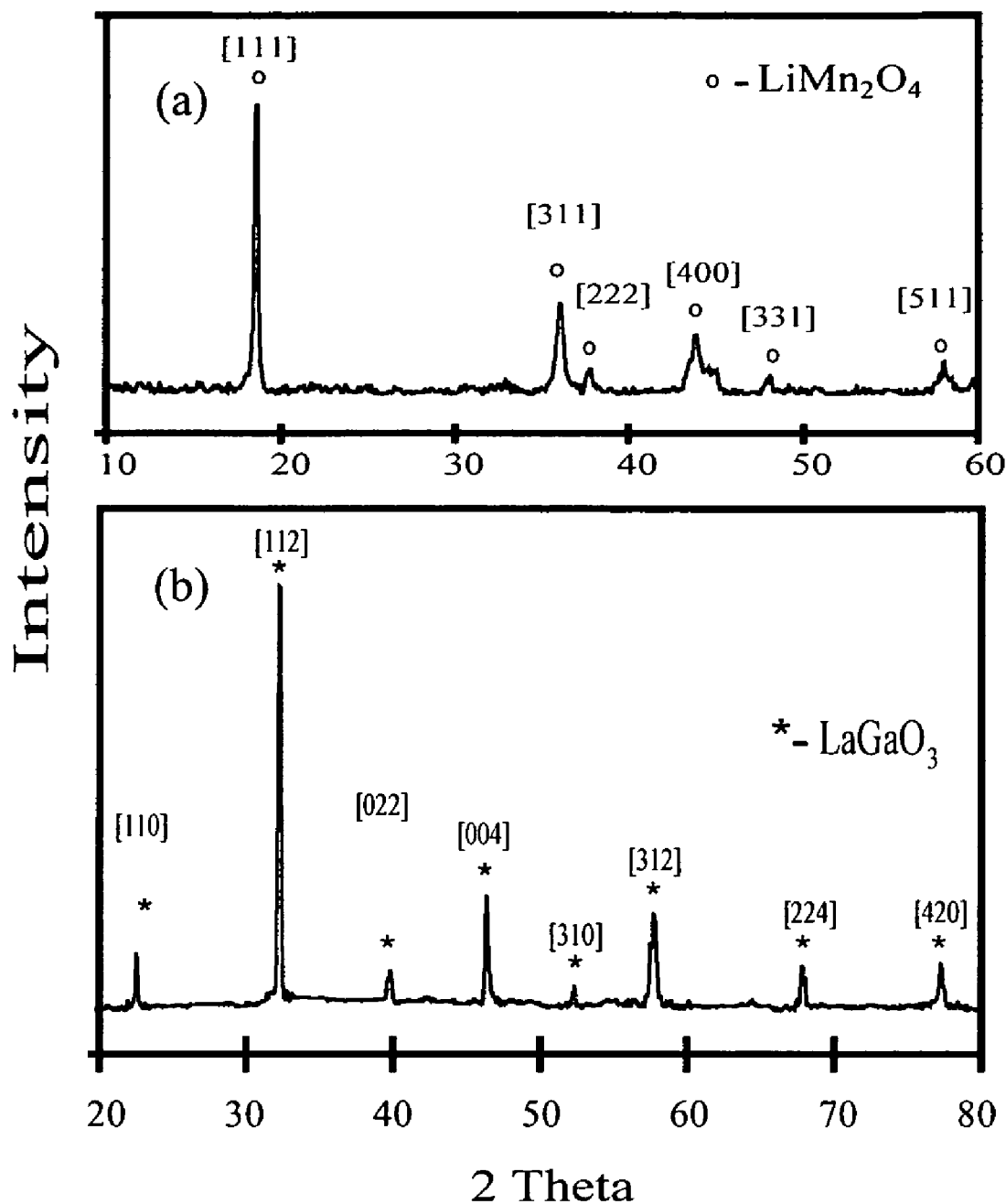
FIGS. 6(a) and 6(b) are X-ray powder diffraction patterns of as-synthesized powders of (a) lithium manganese LiMn$_2$O$_4$ and (b) lanthanum gallium oxide LaGaO$_3$ produced by carbon combustion synthesis by reactions (5) and (6)

FIGS. 6(a) and 6(b) are XRD patterns of the combustion products $LiMn_2O_4$ and $LaGaO_3$ obtained by reaction (5) and (6), respectively. The low-angle XRD and the wide-angle scans (2θ=20°-80°) of the as-synthesized powder had a flat background, indicating that the combustion products were crystalline and no amorphous material was present. The XRD indicates that the all the major diffraction peaks for as-synthesized powders were essentially pure $LiMn_2O_4$ and $LaGaO_3$. The lack of diffraction patterns of other species indicates that the concentrations of any other crystalline species must be very low.

Figure 7:
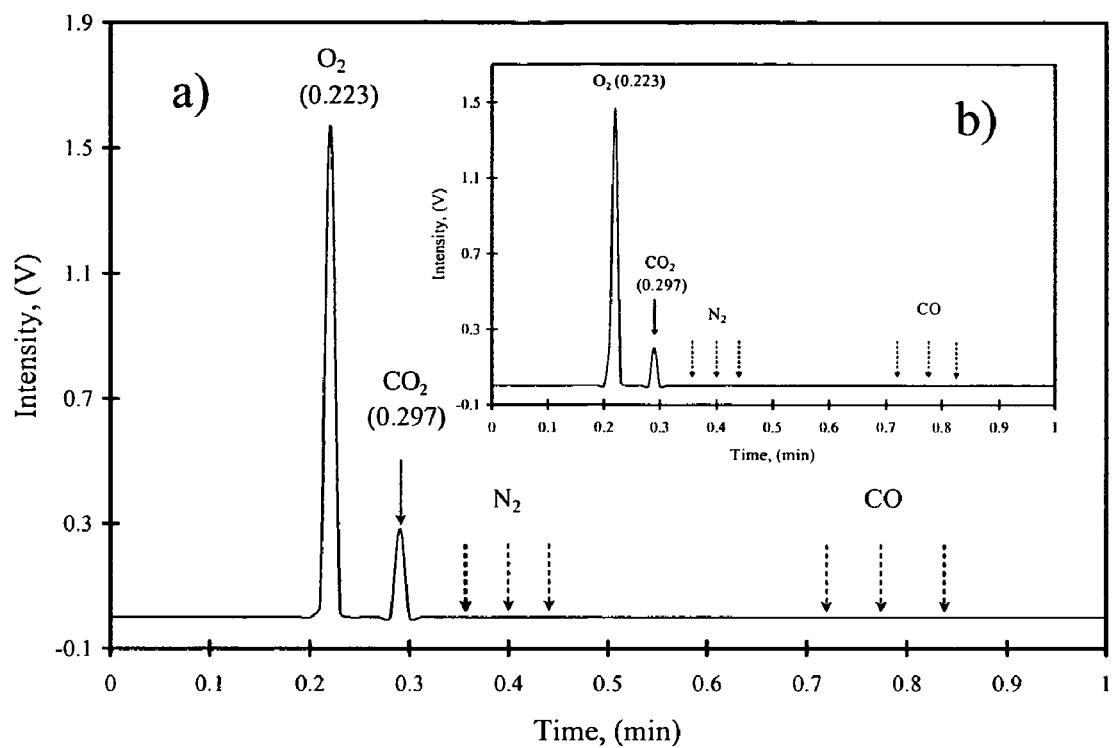
FIGS. 7(a) and 7(b) are chromatograms of the effluent gas during the carbon combustion synthesis of (a) BaTiO$_3$ by reaction (2), and (b) LaGaO$_3$ by reaction (6), wherein dotted arrows show the retention time of the nitrogen and carbon monoxide.

A potential health hazard associated with CCSO is the generation of carbon monoxide. The effluent gas composition during the CCSO of barium titanate, lithium manganese and lanthanum gallium oxide was determined by a three-channel gas micro chromatograph analyzer. Typical data, shown in FIG. 7, revealed that the effluent contained only oxygen and carbon dioxide. The partial pressure of $CO_2$ and $O_2$ was about 6.7% and 93.3 %, respectively. No carbon monoxide CO was detected in the effluents during these CCSO.

The following examples are provided to demonstrate particular embodiments of the present invention. It should be appreciated by those of skill in the art that the methods disclosed in the examples which follow merely represent exemplary embodiments of the present invention. However, those of skill in the art should, in light of the present disclosure, appreciate that many changes can be made in the specific embodiments described and still obtain a like or similar result without departing from the spirit and scope of the present invention.

EXAMPLE 1

This Example serves to illustrate the use of CCSO to synthesize $SrTiO_3$.

Figure 8:
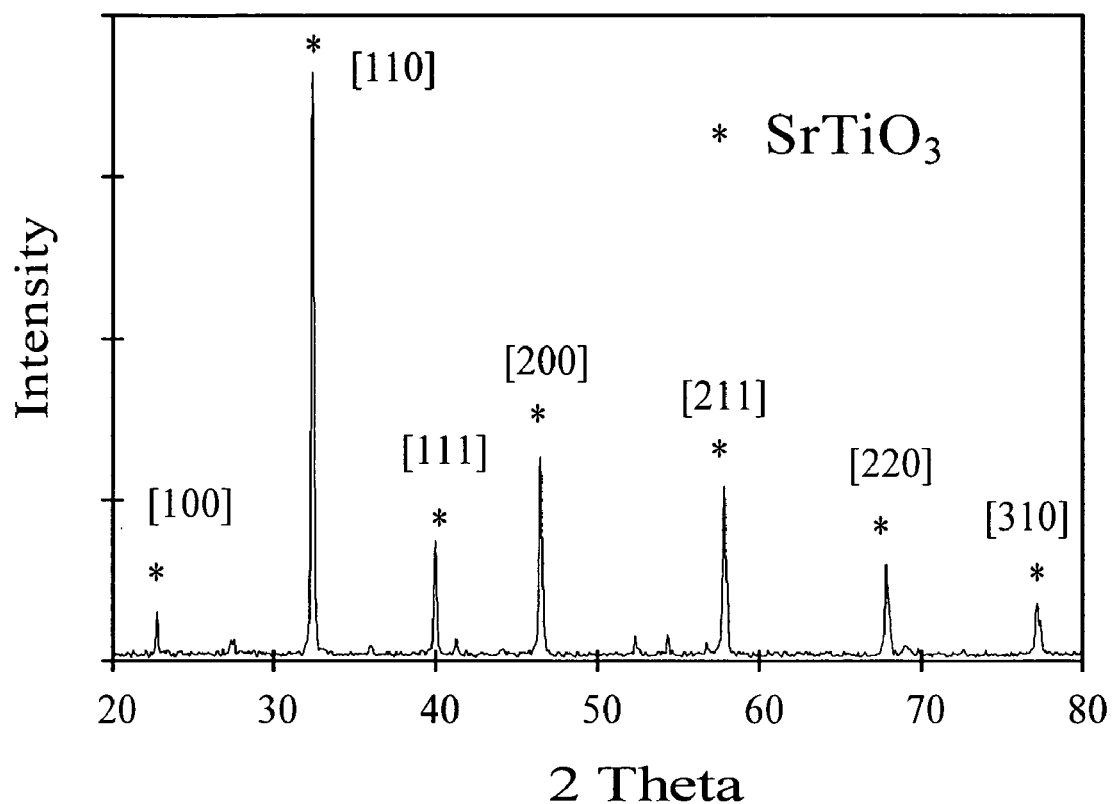
FIG. 8 is an X-ray powder diffraction pattern of an as-synthesized powder of strontium titanate SrTiO$_3$ produced by carbon combustion synthesis, wherein the reactant mixture comprised: SrO (50.42 wt. %), TiO$_2$ (38.87 wt. %), and carbon powder (10.71 wt. %)

The ferroelectric oxide $SrTiO_3$ was synthesized from a reactant mixture comprising (in % by mass): strontium oxide (SrO) 50.42, titanium dioxide ($TiO_2$) 38.87 and carbon powder 10.71. The loose mixture was placed into a quartz tube, to which oxygen was fed at a flow rate of 5 l/m. Following ignition, a combustion front formed and propagated at a velocity of 0.32 mm/s, maximum temperature ~1050° C. An XRD pattern of the product showed that the product was pure $SrTiO_3$ (FIG. 8).

EXAMPLE 2

This Example serves to illustrate the use of CCSO to synthesize $BaTiO_3$.

The ferroelectric oxide $BaTiO_3$ was synthesized from a reactant mixture comprising (in % by mass): barium carbonate ($BaCO_3$) 49.68, titanium dioxide ($TiO_2$) 20.11 and carbon powder 30.21. The loose mixture was placed into a quartz tube, to which oxygen was fed at a flow rate of 10 l/m. Following ignition, a combustion front formed and propagated at a velocity of 2.1 mm/s, maximum temperature ~1190° C. An XRD pattern of the product showed that it was pure $BaTiO_3$.

EXAMPLE 3

This Example serves to illustrate the use of CCSO to synthesize $CoFe_2O_4$.

Figure 9:
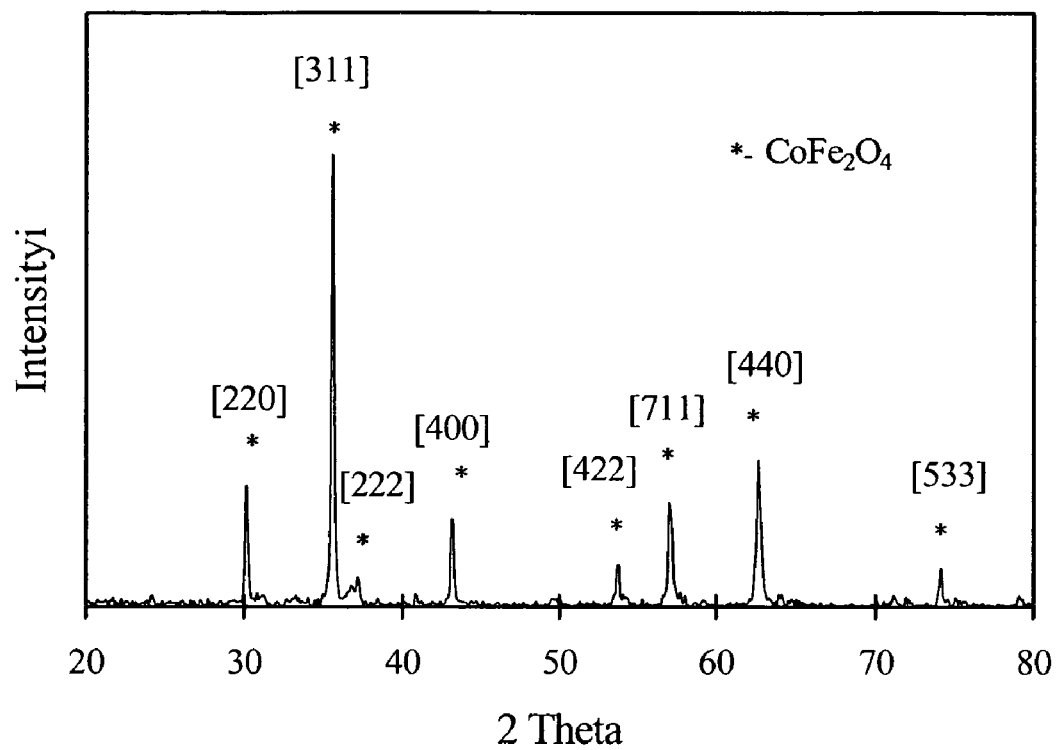
FIG. 9 is an X-ray powder diffraction pattern of an as-synthesized powder of cobalt ferrite CoFe$_2$O$_4$ produced by carbon combustion synthesis, wherein the reactant mixture comprised: cobalt oxide (CoO) (28.52 wt. %), iron oxide (Fe$_2$O$_3$) (60.77 wt. %), and carbon powder (10.71 wt. %)

The hard magnetic ferrite $CoFe_2O_4$ was synthesized from a reactant mixture comprising (in % by mass): cobalt oxide (CoO) 28.52, iron oxide ($Fe_2O_3$) 60.77 and carbon powder 10.71. The loose mixture was placed into a quartz tube, to which oxygen was fed at a flow rate of 5 l/m. Following ignition, a combustion front formed and propagated at a velocity of 0.7 mm/s, maximum temperature ~980° C. An XRD pattern of the product showed that it was pure $CoFe_2O_4$ (FIG. 9).

EXAMPLE 4

This Example serves to illustrate the use of CCSO to synthesize $Y_3Fe_5O_{12}$.

The soft magnetic ferrite $Y_3Fe_5O_{12}$ was synthesized from a reactant mixture comprising (in % by mass): yttrium oxide ($Y_2O_3$) 41.7, iron oxide ($Fe_2O_3$) 49.2 and carbon powder 9.1. The loose mixture was placed into a quartz tube, to which oxygen was fed at a flow rate of 5 l/m. Following ignition, a combustion front formed and propagated at a velocity of 0.8 mm/s, maximum temperature ~1020° C. An XRD pattern of the products showed that it was pure $Y_3Fe_5O_{12}$.

EXAMPLE 5

This Example serves to illustrate the use of CCSO to synthesize $Mn_{0.73}Zn_{0.27}Fe_2O_4$.

The soft magnetic ferrite $Mn_{0.73}Zn_{0.27}Fe_2O_4$ was synthesized from a reactant mixture comprising (in % by mass): manganese carbonate ($MnCO_3$) 25.89, zinc oxide (ZnO) 6.79, iron oxide ($Fe_2O_3$) 49.29 and carbon powder 18.03. The loose mixture was placed into a quartz tube, to which oxygen was fed at a flow rate of 5 l/m. Following ignition, a combustion front formed and propagated at a velocity of 0.9 mm/s, maximum temperature ~1180° C. An XRD pattern of the product showed the 90% conversion of the $Mn_{0.73}Zn_{0.27}Fe_2O_4$.

EXAMPLE 6

This Example serves to illustrate the use of CCSO to synthesize $Mn_{0.25}Zn_{0.75}Fe_2O_4$.

The soft magnetic ferrite $Mn_{0.25}Zn_{0.75}Fe_2O_4$ was synthesized from a reactant mixture comprising (in % by mass): manganese carbonate ($MnCO_3$) 9.74, zinc oxide (ZnO) 20.71, iron oxide ($Fe_2O_3$) 54.26 and carbon powder 15.29. The loose mixture was placed into a quartz tube, to which oxygen was fed at a flow rate of 10 l/m. Following ignition, a combustion front formed and propagated at a velocity of 0.57 mm/s, maximum temperature ~1080° C. An XRD pattern of the product showed the 90% conversion of the $Mn_{0.73}Zn_{0.27}Fe_2O_4$.

EXAMPLE 7

This Example serves to illustrate the use of CCSO to synthesize $Ni_{0.35}Zn_{0.65}Fe_2O_4$.

The soft magnetic ferrite $Ni_{0.35}Zn_{0.65}Fe_2O_4$ was synthesized from a reactant mix comprising (in % by mass): nickel oxide (NiO) 9.96, zinc oxide (ZnO) 20.14, iron oxide ($Fe_2O_3$) 60.81 and carbon powder 9.09. The loose mixture was placed into a quartz tube, to which oxygen was fed at a flow rate of 5 l/m. Following ignition, a combustion front formed and propagated at a velocity of 0.8 mm/s, maximum temperature ~1010° C. An XRD pattern of the product showed that it was pure $Ni_{0.35}Zn_{0.65}Fe_2O_4$.

EXAMPLE 8

This Example serves to illustrate the use of CCSO to synthesize $BaFe_{12}O_{19}$.

The hard magnetic ferrite $BaFe_{12}O_{19}$ was synthesized from a reactant mixture comprising (in % by mass): barium carbonate ($BaCO_3$) 13.91, iron oxide ($Fe_2O_3$) 69.42 and carbon powder 16.67. The loose mixture was placed into a quartz tube, to which oxygen was fed at a flow rate of 8 l/m. Following ignition, a combustion front formed and propagated at a of 1.1 mm/s, maximum temperature ~1200° C. An XRD pattern of the product showed as pure hexaferrite phase $BaFe_{12}O_{19}$.

EXAMPLE 9

This Example serves to illustrate the use of CCSO to synthesize $SrFe_{12}O_{19}$.

The hard magnetic ferrite $SrFe_{12}O_{19}$ was synthesized from a reactant mixture comprising (in % by mass): strontium carbonate ($SrCO_3$) 10.86, iron oxide ($Fe_2O_3$) 72.47 and carbon powder 16.67. The loose mixture was placed into a quartz tube, to which oxygen was fed at a flow rate of 8 l/m. Following ignition, a combustion front formed and propagated at a velocity of 1.1 mm/s, maximum temperature ~1150° C. An XRD pattern of the product showed that it was pure hexaferrite phase $SrFe_{12}O_{19}$.

EXAMPLE 10

This Example serves to illustrate the use of CCSO to synthesize $La_{0.5}Sr_{0.5}Fe_{0.8}Ga_{0.2}O_3$.

The catalyst and fuel cell component $La_{0.5}Sr_{0.5}Fe_{0.8}Ga_{0.2}O_3$ was synthesized from a reactant mixture comprising (in % by mass): lanthanum oxide ($La_2O_3$) 33.69, strontium oxide (SrO) 21.42, iron oxide ($Fe_2O_3$) 26.41, gallium oxide ($Ga_2O_3$) 7.76 and carbon powder 10.72. The loose mixture was placed into a quartz tube, to which oxygen was fed at a flow rate of 5 l/m. Following ignition, a combustion front formed and propagated at a velocity of 0.42 mm/s, maximum temperature ~970° C. An XRD pattern of the product showed that it was $La_{0.5}Sr_{0.5}Fe_{0.8}Ga_{0.2}O_3$.

EXAMPLE 11

This Example serves to illustrate the use of CCSO to synthesize $La_{0.8}Sr_{0.2}MnO_3$.

Figure 10:
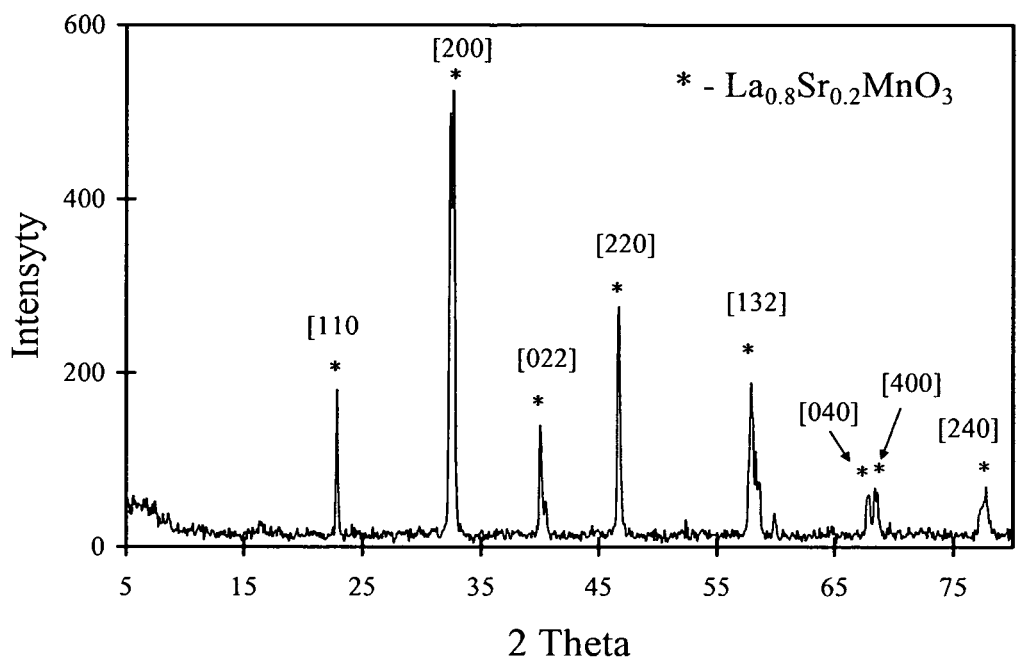
FIG. 10 is an X-ray powder diffraction pattern of an as-synthesized powder of La$_{0.8}$Sr$_{0.2}$MnO$_3$ produced by carbon combustion synthesis, wherein the reactant mixture comprised: lanthanum oxide (La$_2$O$_3$) (43.2 wt. %), strontium oxide (SrO) (6.9 wt. %), iron oxide (MnCO$_3$) (37.98 wt. %), and carbon powder (11.92 wt. %)

The solid oxide fuel cells (SOFC) interconnect materials $La_{0.8}Sr_{0.2}MnO_3$ was synthesized from a reactant mixture comprising (in % by mass): lanthanum oxide ($La_2O_3$) 43.2, strontium oxide (SrO) 6.9, manganese carbonate ($MnCO_3$) 37.98, and carbon powder 11.92. The loose mixture was placed into a quartz tube, to which oxygen was fed at a flow rate of 8 l/m. Following ignition, a combustion front formed and propagated at a velocity of 0.58 mm/s, maximum temperature ~1080° C. An XRD pattern of the product showed that it was $La_{0.8}Sr_{0.2}MnO_3$ (FIG. 10).

EXAMPLE 12

This Example serves to illustrate the use of CCSO to synthesize $La_{0.6}Sr_{0.4}MnO_3$.

The solid oxide fuel cells (SOFC) interconnect materials $La_{0.6}Sr_{0.4}MnO_3$ was synthesized from a reactant mixture comprising (in % by mass): lanthanum oxide ($La_2O_3$) 37.29, strontium oxide (SrO) 15.82, manganese oxide ($MnO_2$) 33.16, and carbon powder 13.73. The loose mixture was placed into a quartz tube, to which oxygen was fed at a flow rate of 10 l/m. Following ignition, a combustion front formed and propagated at a velocity of 0.96 mm/s, maximum temperature ~1160° C. An XRD pattern of the product showed that it was $La_{0.6}Sr_{0.4}MnO_3$.

EXAMPLE 13

This Example serves to illustrate the use of CCSO to synthesize $CoAl_2O_4$.

The pigment $CoAl_2O_4$, which has a blue color, was synthesized from a reactant mixture comprising (in % by mass): cobalt oxide (CoO) 38.51, aluminum oxide ($Al_2O_3$) 52.4 and carbon powder 9.09. The loose mixture was placed into a quartz tube, to which oxygen was fed at a flow rate of 10 l/m. Following ignition, a combustion front formed and propagated at a velocity of 0.38 mm/s, maximum temperature ~916° C. An XRD pattern of the product showed that it was pure $CoAl_2O_4$.

EXAMPLE 14

This Example serves to illustrate the use of CCSO to synthesize $Co_2B_2O_5$.

The pigment $Co_2B_2O_5$, which has a pink color, was synthesized from a reactant mixture comprising (in % by mass): cobalt oxide (CoO) 62.07, boron oxide ($B_2O_3$) 28.84 and carbon powder 9.09. The loose mixture was placed into a quartz tube, to which oxygen was fed at a flow rate of 8 l/m. Following ignition, a combustion front formed and propagated at a velocity of 0.45 mm/s, maximum temperature ~996° C. An XRD pattern of the product showed that it was pure $Co_2B_2O_5$.

EXAMPLE 15

This Example serves to illustrate the use of CCSO to synthesize $LiGa_5O_8$.

The optoelectronic spinel $LiGa_5O_8$ was synthesized from a reaction mixture comprising (in % by mass): lithium oxide ($Li_2O$) 2.76, gallium oxide ($Ga_2O_3$) 86.52 and carbon powder 10.72. The loose mixture was placed into a quartz tube, to which oxygen was fed at a flow rate of 8 l/m. Following ignition, a combustion front formed and propagated at a velocity of 0.31 mm/s, maximum temperature ~970° C. An XRD pattern of the product showed that it was pure $LiGa_5O_8$.

EXAMPLE 16

This Example serves to illustrate the use of CCSO to synthesize $CaSnO_3$.

The calcium stannates $CaSnO_3$ was synthesized from a reactant mixture comprising (in % by mass): calcium oxide (CaO) 23.1, tin oxide ($SnO_2$) 62.07 and carbon powder 14.83. The loose mixture was placed into a quartz tube, to which oxygen was fed at a flow rate of 8 l/m. Following ignition, a combustion front formed and propagated at a velocity of 0.42 mm/s, maximum temperature ~1070° C. An XRD pattern of the products showed that it was pure $CaSnO_3$.

EXAMPLE 17

This Example serves to illustrate the use of CCSO to synthesize $ZnGa_2O_4$.

The spinel $ZnGa_2O_4$ was synthesized from a reactant mixture comprising (in % by mass): zinc oxide (ZnO) 25.68, gallium oxide ($Ga_2O_3$) 59.17 and carbon powder 15.15. The loose mixture was placed into a quartz tube, to which oxygen was fed at a flow rate of 8 l/m. Following ignition, a combustion front formed and propagated at a velocity of 0.56 mm/s, maximum temperature ~1120° C. An XRD pattern of the products showed that it was pure $ZnGa_2O_4$.

EXAMPLE 18

This Example serves to illustrate the use of CCSO to synthesize $LaAlO_3$.

Figure 11:
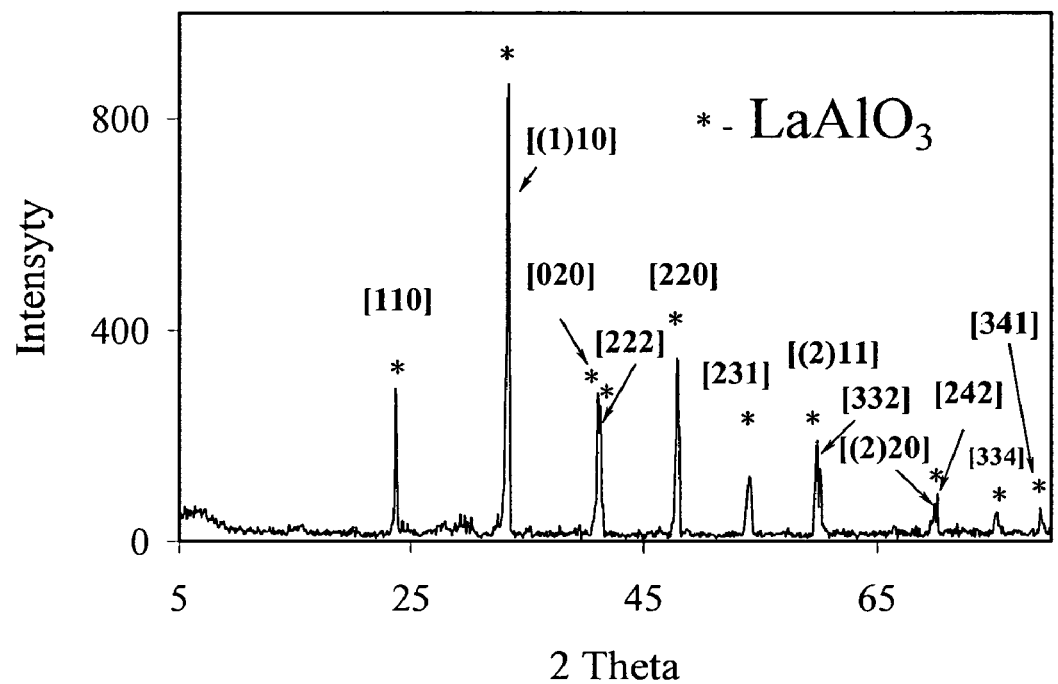
FIG. 11 is an X-ray powder diffraction pattern of an as-synthesized powder of aluminum lanthanum oxide LaAlO$_3$, wherein the reactant mixture comprised: lanthanum oxide (La$_2$O$_3$) (68.0 wt. %), aluminum oxide (Al$_2$O$_3$) (21.28 wt. %), and carbon powder (10.72 wt. %).

The optoelectronic aluminum lanthanum oxide $LaAlO_3$ was synthesized from a reactant mixture comprising (in % by mass): lanthanum oxide ($La_2O_3$) 68.0, aluminum oxide ($Al_2O_3$) 21.28 and carbon powder 10.72. The loose mixture was placed into a quartz tube, to which oxygen was fed at a flow rate of 8 l/m. Following ignition, a combustion front formed and propagated at a velocity of 0.85 mm/s, maximum temperature ~1100° C. An XRD pattern of the products showed that it was pure $LaAlO_3$ (FIG. 11).

EXAMPLE 19

This Example serves to illustrate the use of CCSO to synthesize $LaMnO_3$.

The lanthanum manganese oxide $LaMnO_3$ was synthesized from a reactant mixture comprising (in % by mass): lanthanum oxide ($La_2O_3$) 60.37, manganese oxide (MnO) 26.29 and carbon powder 13.34. The loose mixture was placed into a quartz tube, to which oxygen was fed at a flow rate of 10 l/m. Following ignition, a combustion front formed and propagated at a velocity of 0.5 mm/s, maximum temperature ~1090° C. An XRD pattern of the products showed that it was pure $LaMnO_3$.

In summary, the present invention is directed to a method (CCSO) comprising the steps of forming a powdered reactant mixture and igniting the reactant mixture to initiate reaction. The reactant mixture generally comprises one or more oxide precursor species such as, but not limited to, metal oxides or super oxides, metal carbonates, metal nitrides, metal halides, metal oxalates, and combinations thereof; but generally no pure metal. The reactant mixture further comprises powdered carbon in the form of, e.g., graphite powder or soot, and the entire reactant mixture is exposed to gaseous oxygen. Following ignition, the exothermic reaction between the carbon and oxygen generates a propagating temperature wave that causes a reaction among the reactants. The final product(s) are simple or complex oxides of elements present in oxide precursor species. CCSO can be used to produce oxides even when SHS cannot be applied, such as when the pure metal is pyrophoric (e.g., Li and La) or that it melts at room temperature (e.g., Ga) or that the combustion heat of the metal is relatively low. An example is the synthesis of lithium gallium oxide ($LiGa_5O_8$) or lanthanum gallium oxide ($LaGaO_3$) by the new process. In contrast to the common SHS, the heat-generating product (carbon dioxide) departs from the sample, which makes the products porous and friable. This is an important feature for further processing of the product. In addition, the lubricating properties of the carbon help attain a uniform reactant mixture following ball milling.

All patents and publications referenced herein are hereby incorporated by reference. It will be understood that certain of the above-described structures, functions, and operations of the above-described embodiments are not necessary to practice the present invention and are included in the description simply for completeness of an exemplary embodiment or embodiments. In addition, it will be understood that specific structures, functions, and operations set forth in the above-described referenced patents and publications can be practiced in conjunction with the present invention, but they are not essential to its practice. It is therefore to be understood that the invention may be practiced otherwise than as specifically described without actually departing from the spirit and scope of the present invention as defined by the appended claims.

What is claimed is:

1. A method comprising the steps of:
   a) mixing at least one powdered oxide precursor with a carbon powder to form a reactant mixture;
   b) placing the reactant mixture in a reactor environment comprising oxygen; and
   c) igniting the reactant mixture;
   wherein the igniting step is conducted locally on the reactant mixture; and
   wherein the igniting step produces a reaction between the carbon powder and the oxygen;
   wherein the reaction between the carbon powder and the oxygen generates a propagating temperature front that moves through the reactant mixture; and
   wherein the propagating temperature front converts the at least one powdered oxide precursor into an oxide product.

2. The method of claim 1, wherein the at least one powdered oxide precursor is selected from the group consisting of metal containing compounds, non-metal containing compounds, and combinations thereof.

3. The method of claim 2, wherein the metal containing compounds are selected from the group consisting of metal oxides, metal nitrides, metal carbonates, metal nitrides, metal oxalates, metal halides, metal phosphates, metal sulfates, and combinations thereof.

4. The method of claim 2, wherein the non-metal containing compounds comprise at least one non-metal element selected from the group consisting of B, Si, As, Te, Ge, P, Se, S, and combinations thereof; and wherein the non-metal containing compounds comprise a species selected from the group consisting of oxides, nitrides, carbides, and combinations thereof.

5. The method of claim 1, wherein the carbon powder is selected from the group consisting of carbon black, graphite, activated carbon, soot, petroleum coke, and combinations thereof.

6. The method of claim 1, wherein the carbon powder comprises about 5 wt. % to about 60 wt. % of the reactant mixture.

7. The method of claim 1, wherein the reactor environment comprises a type selected from the group consisting of a flow reactor and a static reactor.

8. The method of claim 1, wherein the step of igniting the reactant mixture comprises a technique selected from the group consisting of flame ignition, electrical heater ignition, laser beam ignition, microwave ignition, and combinations thereof.

9. The method of claim 1, wherein the oxide product is selected from the group consisting of simple oxides, complex oxides, and combinations thereof.

10. The method of claim 1, wherein the oxide product is porous.

11. The method of claim 1, wherein the oxide product is friable.

12. A method comprising the steps of:
   a) mixing at least one powdered metal oxide precursor with a carbon powder to form a reactant mixture;
   b) placing the reactant mixture in a reactor environment comprising oxygen; and
   c) igniting the reactant mixture;
   wherein the igniting step is conducted locally on the reactant mixture; and
   wherein the igniting step produces a reaction between the carbon powder and the oxygen;
   wherein the reaction between the carbon powder and the oxygen generates a propagating temperature front that moves though the reactant mixture; and
   wherein the propagating temperature front converts the at least one powdered metal oxide precursor into a metal oxide product.

13. The method of claim 12, wherein the at least one powdered metal oxide precursor is selected from the group consisting of metal oxides, metal nitrides, metal carbonates, metal oxalates, metal halides, metal phosphates, metal sulfates, and combinations thereof.

14. The method of claim 12, wherein the at least one powdered metal oxide precursor comprise an average particle size of about 2 nm to about 500 micron.

15. The method of claim 12, wherein the carbon powder is selected from the group consisting of carbon black, graphite, activated carbon, soot, petroleum coke, and combinations thereof.

16. The method of claim 12, wherein the carbon powder comprises about 5 wt. % to about 60 wt. % of the reactant mixture.

17. The method of claim 12, wherein the reactor environment comprises a flow reactor.

18. The method of claim 12, wherein the step of igniting the reactant mixture comprises a technique selected from the group consisting of flame ignition, electrical heater ignition, laser beam ignition, microwave ignition, and combinations thereof.

19. The method of claim 12, wherein the metal oxide product is selected from the group consisting of simple oxides, complex oxides, and combinations thereof.

20. A method comprising the steps of:
   a) mixing at least one powdered metal oxide precursor with a carbon powder to form a reactant mixture;
   b) placing the reactant mixture in a reactor environment comprising oxygen; and
   c) igniting the reactant mixture;
   wherein the igniting step is conducted locally on the reactant mixture;
   wherein the igniting step comprises a technique selected from the group consisting of flame ignition, electrical heater ignition, laser beam ignition, microwave ignition, and combinations thereof; and
   wherein the igniting step produces a reaction between the carbon powder and the oxygen;
   wherein the reaction between the carbon powder and the oxygen generates a propagating temperature front that moves though the reactant mixture; and wherein the propagating temperature front converts the at least one powdered metal oxide precursor into a complex metal oxide product.

21. The method of claim 20, wherein the carbon powder is selected from the group consisting of carbon black, graphite, activated carbon, soot, petroleum coke, and combinations thereof.

22. The method of claim 20, wherein the carbon powder comprises about 5 wt. % to about 60 wt. % of the reactant mixture.

23. The method of claim 1, wherein the propagating temperature front moves through the reactant mixture at a velocity of at most about 3 mm/s.

24. The method of claim 12, wherein the propagating temperature front moves through the reactant mixture at a velocity of at most about 3 mm/s.

25. The method of claim 20, wherein the propagating temperature front moves through the reactant mixture at a velocity of at most about 3 mm/s.

* * * * *